United States Patent [19]
Rich et al.

[11] Patent Number: 5,918,228
[45] Date of Patent: Jun. 29, 1999

[54] METHOD AND APPARATUS FOR ENABLING A WEB SERVER TO IMPERSONATE A USER OF A DISTRIBUTED FILE SYSTEM TO OBTAIN SECURE ACCESS TO SUPPORTED WEB DOCUMENTS

[75] Inventors: Bruce Arland Rich, Round Rock; Theodore Jack London Shrader, Cedar Park; Michael Bradford Ault, Austin; Ernst Robert Plassmann, Pflugerville; Mickella Ann Rosiles, Austin; Shaw-Ben Shi, Austin; Rodney Carl Burnett, Austin, all of Tex.

[73] Assignee: International Business Machines Corporation, Armonk, N.Y.

[21] Appl. No.: 08/790,042

[22] Filed: Jan. 28, 1997

[51] Int. Cl.$^6$ .................................................. G06F 17/00
[52] U.S. Cl. ............................................. 707/10; 707/104
[58] Field of Search ........................... 707/1, 8, 10, 104; 380/4, 21, 23; 395/187.01, 200.59, 680, 200.03

[56] References Cited

U.S. PATENT DOCUMENTS

| | | | |
|---|---|---|---|
| 5,187,790 | 2/1993 | East et al. ................................. | 395/684 |
| 5,220,603 | 6/1993 | Parker ........................................ | 380/21 |
| 5,235,642 | 8/1993 | Wobber et al. ........................... | 380/25 |
| 5,418,854 | 5/1995 | Kaufman et al. ......................... | 380/23 |
| 5,454,000 | 9/1995 | Dorfman ............................. | 395/185.07 |
| 5,481,715 | 1/1996 | Hamilton et al. ........................ | 395/684 |
| 5,495,533 | 2/1996 | Linehan et al. ........................... | 380/21 |
| 5,497,463 | 3/1996 | Stein et al. .......................... | 395/200.03 |
| 5,560,008 | 9/1996 | Johnson et al. .......................... | 395/680 |
| 5,566,326 | 10/1996 | Hirsch et al. ............................ | 395/500 |
| 5,566,327 | 10/1996 | Sehr ........................................ | 707/104 |
| 5,572,711 | 11/1996 | Hirsch et al. ............................ | 395/500 |
| 5,634,122 | 5/1997 | Loucks et al. ................................ | 707/8 |
| 5,649,099 | 7/1997 | Theimer et al. ..................... | 395/187.01 |
| 5,678,041 | 10/1997 | Baker et al. .................................. | 707/9 |
| 5,708,709 | 1/1998 | Rose ........................................... | 380/4 |
| 5,708,780 | 1/1998 | Levergood et al. ............... | 395/200.59 |
| 5,737,523 | 4/1998 | Callaghan et al. ................. | 395/187.01 |
| 5,745,750 | 4/1998 | Porcaro ....................................... | 707/1 |

FOREIGN PATENT DOCUMENTS

| | | |
|---|---|---|
| 2138302 | 6/1996 | Canada . |
| 9517063 | 6/1995 | WIPO . |

OTHER PUBLICATIONS

IBM Technical Disclosure Bulletin "Architecture for a Distributed Computing Environment Test Application—Harmonic," vol. 39, No. 6, Jun. 1996.

IBM Technical Disclosure Bulletin "Cross–Process Transmission of Security Context," vol. 38, No. 11, Nov. 1995.

IBM Technical Disclosure Bulletin "Flexible Specification of Distributed Computing Environment Security Login Contexts," vol. 38, No. 11, Nov. 1995.

*Primary Examiner*—Wayne Amsbury
*Assistant Examiner*—Thuy Pardo
*Attorney, Agent, or Firm*—Jeffrey S. LaBaw; David H. Judson

[57] ABSTRACT

A method of enabling a Web server to impersonate a Web client to thereby obtain access to files stored in a distributed file system of a distributed computing environment. The distributed computing environment includes a security service for returning a credential to a user authenticated to access the distributed file system. In response to receipt of a transaction request from the Web client, a determination is made whether the transaction request has originated from a user authenticated to access the distributed file system. If so, the Web server is controlled to reuse the credential of the user across multiple file accesses in the distributed file system on behalf of the Web client.

18 Claims, 3 Drawing Sheets

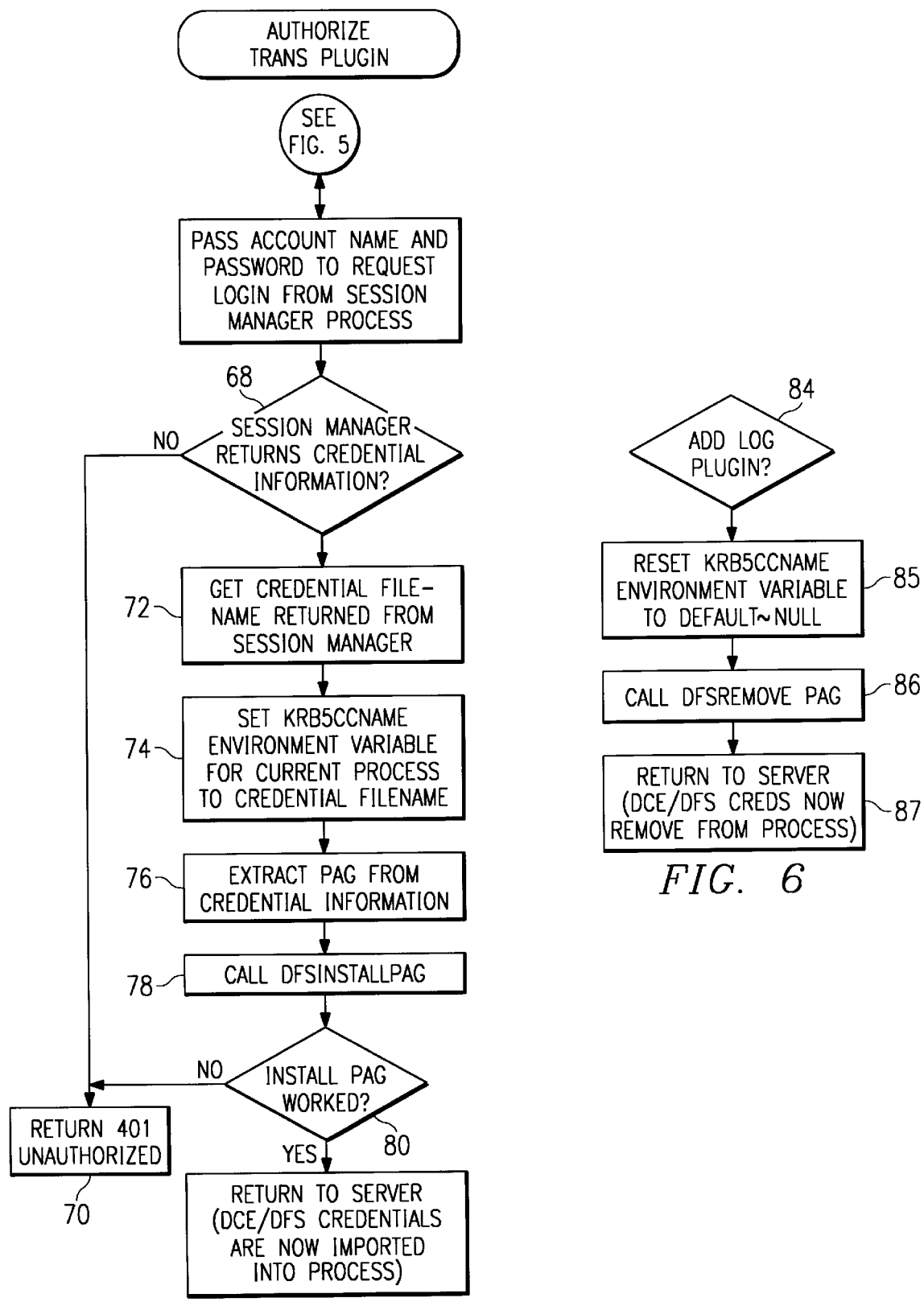

METHOD AND APPARATUS FOR ENABLING A WEB SERVER TO IMPERSONATE A USER OF A DISTRIBUTED FILE SYSTEM TO OBTAIN SECURE ACCESS TO SUPPORTED WEB DOCUMENTS

TECHNICAL FIELD

The present invention relates generally to Web transaction processing and more particularly to enabling access to Web documents stored in a secure distributed file system.

BACKGROUND OF THE INVENTION

The World Wide Web of the Internet is the most successful distributed application in the history of computing. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and receives in return a document formatted according to HTML.

The Web server is usually a standalone file server that services various Web document requests. Because the server is self-contained, web site administration is cumbersome because access control must be individualized for each device.

Moreover, private and public enterprises are now setting up so-called "Intranets" within their organizations to allow employees and customers to access data on their own corporate Web sites. Such organizations use multiple computers interconnected into a distributed computing environment in which users access distributed resources and process applications. A known distributed computing environment, called DCE, has been implemented using software available from the Open Systems Foundation (OSF). As DCE environments become the enterprise solution of choice, many applications may be utilized to provide distributed services such as data sharing, printing services and database access. OSF DCE includes a distributed file system, called Distributed File Services (DFS), for use in these environments.

DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace.

Multiple servers can export their file system to this namespace. All DFS users, in the meantime, share this namespace, making all DFS files readily available from any DFS client machine.

It would be highly desirable to extend the functionality of existing standalone Web servers in the enterprise environment to take advantage of the scalability, file availability and security features of DFS (or other similar distributed file systems). As a by-product, users with an off-the-shelf browser would be able to easily access the Web information stored in the DFS namespace with no additional software on the client machine.

BRIEF SUMMARY OF THE INVENTION

It is thus a primary object of the invention to extend the functionality of a standalone Web server in the enterprise setting to take advantage of distributed file system capabilities.

It is another object of the invention to enable a client browser to access Web documents stored in a distributed file system without changes to the browser software.

It is still another object to enable a Web server to efficiently and rapidly switch the "identity" it presents to a distributed file system. This enables the Web server to transparently "borrow" the credentials of a user that has been authenticated to access the distributed file system.

It is another object to allow users with off-the-shelf browsers to access Web documents stored in a distributed file system global namespace with a single login.

Another important object of the invention is to provide a server application function (SAF) plug-in for a Web server that enables the server to efficiently establish and maintain a security context in the World Wide Web environment.

A more general object of the invention is to enable any gateway function (e.g., a Web server) to rapidly "modulate" between identities presented to an environment whose resources are accessed through the gateway. Preferably, the invention is implemented as a server application function (SAF) plug-in to a Web server program together with a session manager process. In operation, the session manager process is invoked by the Web server when a user attempts to access a DFS file. If a user has already been authenticated by a DCE Security Service associated with DFS, the session manager returns the user credential to the Web server, and the server uses this credential to retrieve DFS documents on behalf of the user. If the user has not been authenticated, the session manager performs a login sequence for the user and obtains the credential from the DCE Security Service.

The session manager maintains an in-memory database to keep track of which user has logged in so that multiple Web transactions may be carried out with a single login. In particular, this database stores a user "credential," which comprises the user id, password, a credential file name, and an authentication identifier known as a Process Authentication Group (PAG). The PAG acts as a tag to associate "tickets" between DFS and the DCE Security Service. In DCE, an authenticated user thus has a credential that includes a PAG. On subsequent arrivals of the same user id and password at the Web server, the DCE Security Service would normally make a call into the DFS kernel to obtain a new PAG, which would then be stamped into the Web server process. According to the present invention, however, the PAG in the original credential is maintained (i.e. is not modulated) from one Web transaction to another transaction. In other words, PAGs are reused by the Web server (until a RemovePAG call is made), thereby avoiding network traffic between the DCE Security Service and DFS that would significantly increase the file access time.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will. be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 is a detailed flowchart showing the process flow of the server plug-in of the invention for providing DCE/DFS authentication and importing DCE/DFS credentials into a Web server process;

FIG. 6 is a flowchart illustrating a routine for removing DCE/DFS credentials from a Web server process according to the invention.

DETAILED DESCRIPTION

Figure 1:
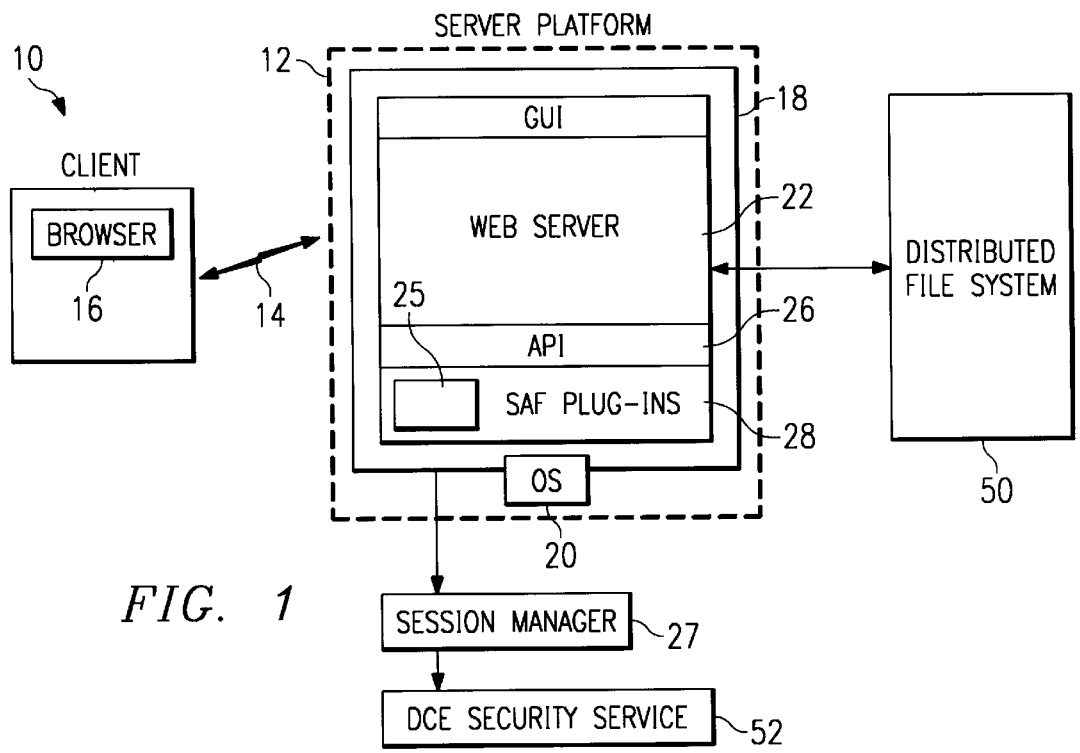
FIG. 1 is a representative system in which the server application function (SAF) plug-in and session manager of the present invention are implemented.

A representative system in which the present invention is implemented is illustrated in FIG. 1. A client machine 10 is connected to a Web server platform 12 via a communication channel 14. For illustrative purposes, channel 14 is the Internet, an Intranet or other known connection. In the case of the Internet, Web server platform 12 is one of a plurality of servers which are accessible by clients, one of which is illustrated by machine 10. A client machine includes a browser 16, which is a known software tool used to access the servers of the network. Representative browsers include, among others, Netscape Navigator (all versions), Microsoft Internet Explorer (all versions) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, *RISC System/6000, 7013 and 7016 POWERstation and POWERserver Hardware Technical Reference,* Order No. SA23-2644-00. AIX OS is described in *AIX Operating System Technical Reference,* published by IBM Corporation, First Edition (November 1985), and other publications. While the above platform is useful, any other suitable hardware/operating system/web server combinations may be used.

Figure 2:
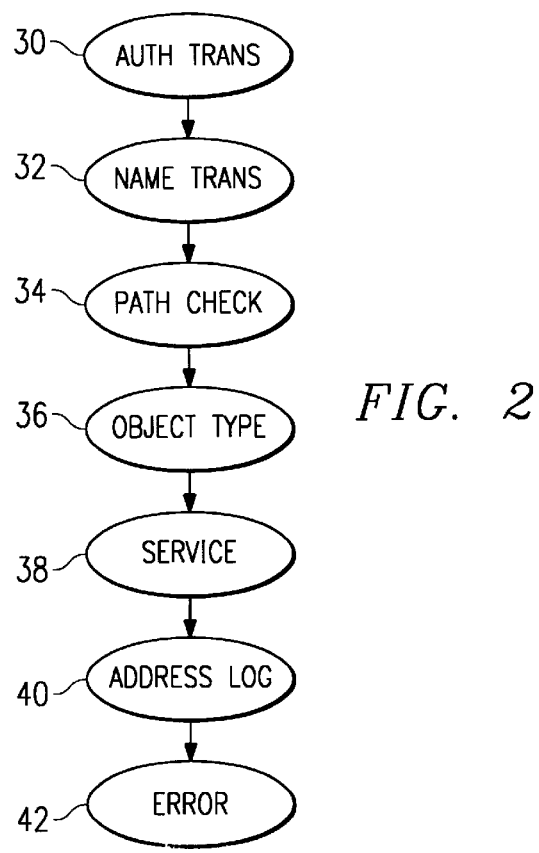
FIG. 2 is a flowchart of a conventional Web transaction implemented by a Web server in response to receipt of a request from a client machine.

The Web Server accepts a client request and returns a response. The operation of the server 18 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME type information (e.g., text/html, image/gif, etc.) for the given document is identified. At step 38, called Service (Service), the Web server routine selects an internal server function to send the result back to the client via a normal server-service routine. The particular function selected depends on the nature of the request. At step 40, called Add Log (AddLog), information about the transaction is recorded. At step 42, called Error, the server responds to the client when it encounters an error. Further details of these operations may be found in the Netscape Web Server Programmer's Guide, Chapter 5, which is incorporated herein by reference.

Thus, the Web server 18 includes a known set of server application functions (SAFs) 28. These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins." The present invention makes use of the server API 26 to provide for a plug-in SAF 25 that, together with a session manager process 27, facilitates special forms of authorization translation (AuthTran) and path checking (PathCheck) to enable Web access to documents on a distributed file system 50.

In particular, according to a general object of the present invention, it is desired to enable the user of the client machine 10 (intentionally or unknowingly) to use the (preferably) off-the-shelf browser 16 to access, browse and retrieve documents located in the distributed file system 50. In the preferred embodiment, the plug-in SAF 25 and session manager process 27 provide a novel mechanism to achieve this object. One such file system 50 is Distributed File Services (DFS), which is a known distributed file system implemented in a networked environment called the Distributed Computing Environment (DCE). DCE has been implemented using software available from the Open Systems Foundation (OSF). In a distributed computing environment, a group of machines is typically referred to as a "domain." An OSF DCE domain is called a "cell." A DCE cell may be a complex environment involving hundreds of machines in many locations.

DCE DFS 50 provides data sharing services by making use of remote procedure calls (RPC's) for naming, and a DCE Security Service 52 for authentication services. DFS 50 interfaces to the DCE Security Service 52 via the session manager process 27, as will be described below. In addition to its use of DCE Services, DFS itself is rich in features. It provides a uniform global filespace which allows all DFS client users to see the same view of the filespace, and it caches filesystem data at the client for improved scalability and performance by reducing network traffic to file servers. DFS also supports advisory file locking, and one of its features in the ability to export the operating system's native filesystem. For example, in the case of the AIX Operating System, the native filesystem is the Journaled File System (JFS). In addition, DFS also provides its own physical filesystem, the DCE Local File System (LFS). The DCE LFS provides supports for DCE Access Control Lists (ACL's) on files and directories for securing access to data and advanced data management capabilities such as replication and load balancing.

DFS 50 uses so-called DCE Kerberos-based authentication. A unix "credential" is associated with each file operation and holds the local authentication information for that operation. In particular, a credential is a data structure defining a particular machine (or a user on a multi-user machine). From the local operating system's point-of-view, the credential includes a user id, a group id, optionally a list of operating system privileges, and an authentication identifier known as a PAG (Process Authentication Group). The PAG acts as a tag for associating "tickets" between DFS 50 and the DCE Security Server 52. When DFS users authenticate via the DCE Login facility, known as dce_login, the DCE Security Service interacts with DFS (across the network) through a setpag( ) interface to establish the PAG/ticket relationship in the process's credential. On filesystem requests, DFS extracts the PAG from the credential structure to establish the DCE user's authentication for RPC requests to the DFS fileserver.

Figure 3:
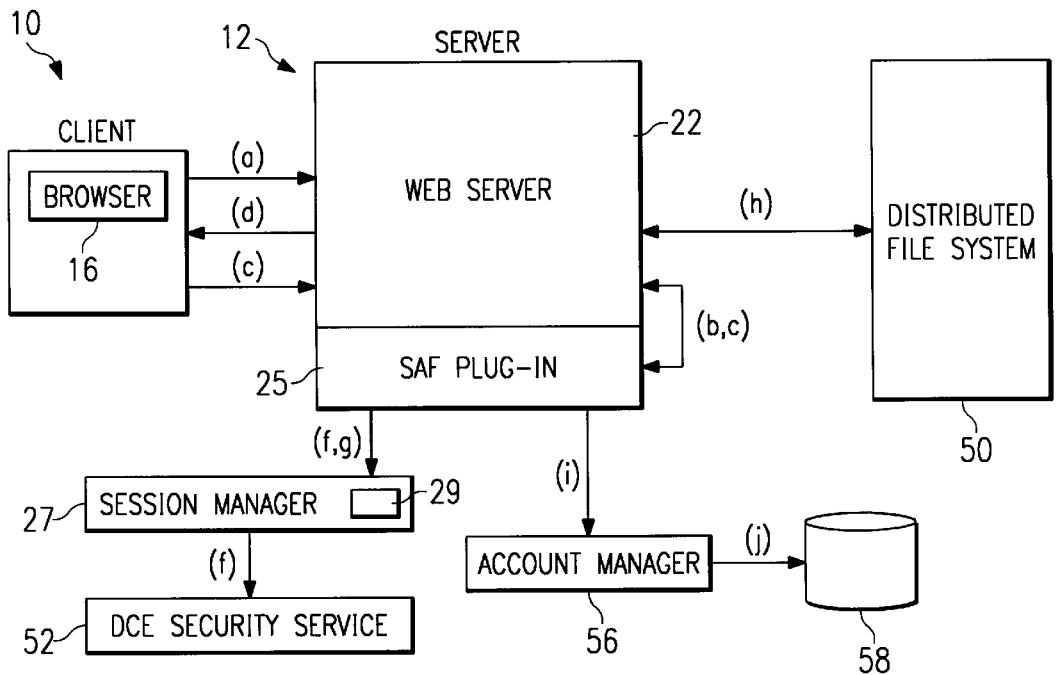
FIG. 3 is a process flow diagram illustrating a Web transaction implemented according to the teachings of the present invention.

The control flow associated with the invention is illustrated in the process flow diagram of FIG. 3. This figures illustrates the basic system of FIG. 1, with the inclusion of an account manager 56 having an associated database 58. Session manager 27 starts up upon initialization of the Web server and is preferably run by the workstation computer 18. It includes its own storage area 29 for reasons to be discussed below. When the client 10 (through the browser 16) requests a DFS document (step a), the Web server 18 invokes a server path check (using the SAF plug-in 25)(step b). The PathCheck checks with the session manager 27 to determine whether the user has appropriate DCE credentials. If not (step c), the SAF plug-in 25 will return an error message (e.g., "401; Unauthorized") to the browser 16 (step d) and prompt the user for user id and password. After getting the userid and password from the user (step e), the SAF plug-in invokes the session manager 27 (step f) to obtain the DCE credential for the user. Session manager 27 returns the DCE credential to the Web server (step g). The server then uses this user credential to represent the user to retrieve documents stored in DFS 50 (step h). After retrieving the documents, the account manager 56 is invoked (step i) (preferably using another API plug-in) to save appropriate usage information into the database 58 (step j).

The session manager 27 is thus invoked by the Web Server when a user attempts to access a DFS file. If a user has already been authenticated by DCE, the Session Manager 27 returns the user credential to the server, which uses this credential to retrieve DFS documents on behalf of the user. If not, the Session Manager 27 will login for the user and obtain the credential from DCE Security. The Session Manager maintains the in-memory database 29 to keep track of which user has logged in so that a user may access multiple DFS pages.

Figure 5:
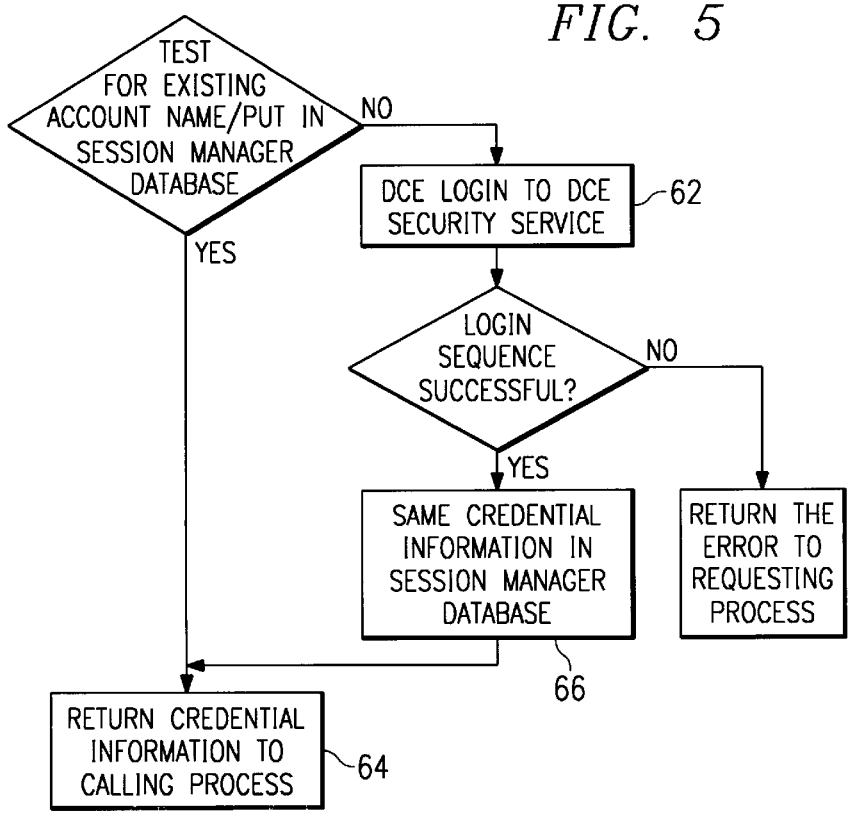
FIG. 5 is a flowchart illustrating the session manager login request routine of FIG. 4.

A detailed flowchart showing the operation provided by the Server Application Function (SAF) plug-in 25 and the session manager process 27 of the present invention is now illustrated in FIGS. 4–5. In general, it should be appreciated that the invention enables the Web server process 22 to impersonate a DCE identity. The method begins when a DCE principal name (actually the account name) first shows up at the Web server platform 12. In particular, at step 60, the routine passes the account name and password to the session manager for login request processing. FIG. 5 illustrates the process in detail. At step 61, a test is made to determine whether the account name and password are already in the session manager database 29. If the outcome of the test at step 61 is positive, the user has already been authenticated and the subroutine continues at step 64 to return the user's credentials to the calling process. If the outcome of the test at step 61 is negative, however, the subroutine continues with step 62. This causes the session manager 27 to perform a full dce_login to the DCE Security Service 52. The session manager preferably runs as the same effective Unix ID as the Web server processes. A test is then made at step 63 to determine if the login sequence was successful. If not, the subroutine returns an error to the requesting process at step 65. If the outcome of the test at step 63 is positive, the resulting user id, password, credential file name, and ticket expiration time are saved for reuse in the session manager database 29. This is step 66. This credential information is then returned to the session manager at step 64, and the subroutine returns. This completes step 60 in FIG. 4.

Referring now back to FIG. 4, on subsequent arrivals to the Web server 18 of the same user id and password, a test is performed by the session manager process at step 68 to determine if the database 29 includes a match for the key (in the simplest case, for example only, the combination of the user id and password). If the outcome of the test at step 68 is negative, an error message (e.g., "401 Unauthorized") is returned to the client at step 70. If the outcome of the test at step 68 is positive (indicating that an unexpired match to the key has been found), the routine continues at step 72 to extract the credential file name from the session manager database entry. An environment variable KRB5CCNAME is then set with that credential file name at step 74. At step 76, the PAG is extracted from the credential file name. At step 78, a system call, referred to dfsInstallPAG, is made to DFS 50, and this call is made in lieu of certain security context processing that would take place in DCE. In particular, when a DCE login is in progress and the user has reached the point where DCE believes the user to be whom he or she purports to be, the DCE credentials are saved in a file owned by the current effective UID but otherwise unreadable. The dce_login process then makes this DCE security context the default one for this process using a sec Login_rset_context( ) call (to set the default context). The sec_login_rset_context( ) function calls into DFS in the kernel, asking it to obtain a new Process Authentication Group (PAG) and to insert it into the kernel environment for the current process. In the conventional operation, DFS stamps this new PAG value into the credential structure of the current process, and then returns this value to the calling program (dce_login). DCE security takes the value, converts it to a printable entity, and then creates a link to the credentials file by this name. For example, if the value that DFS returns is 0x417D5432, then the credential file has two names, one assigned by DCE security, and the other computed from the PAG being dcecred_417D5432.

According to the present invention, significant processing optimization is achieved (after the initial user login) by avoiding the requirement of either performing a full dce_ login, or importing a security context from a file and installing a new PAG in the credential, when the userid and password are later received at the Web server. In contrast to the prior art, system call dfsInstallPAG does not create a new PAG but simply accepts the one that is passed from the session manager (and which was obtained as a result of the original login authentication). Thus, together with the saving of the user credential in the session manager (which obviates multiple logins), the present invention contemplates reuse of the PAG (or other such similar authentication identifier) across multiple Web transactions.

Returning now back to FIG. 4, the remainder of the Web transaction processing is now described. At step 80, DFS determines whether the credential file is readable by the Web server using a kernel level call. If the outcome of the test at step 80 is negative, the routine branches back to step 70 and returns an error message. If the outcome of the test at step 80 is positive, however, the routine continues. At step 82, DFS stamps the PAG into the control block (e.g., the u-block) of the currently-running process of the Web server. At this point, both user-space DCE and kernel-space DFS are content that the Web server is running on behalf of the user whose credentials have been "borrowed." Stated differently, the Web server is now impersonating the user from the kernel-level view as well as from the user-space view because the DCE/DFS credentials are imported into the process. This completes the processing of the server plug-in of the invention. The Web transaction itself continues at step 84, which corresponds (for example) to steps 36 and 38 of FIG. 2.

In the preferred embodiment, it is desirable to remove the DCE identity from the Web server so that random Web processes are not always running with the DCE credentials of the last DCE user handled by this process. This is accomplished by the routine of FIG. 6. This routine begins at step 84 by testing whether or not the logging SAF (e.g., step 40 in FIG. 2) has been carried out (in other words, that the user has been provided with the requested document). If the outcome of the test at step 84 is positive, the KRB5CCNAME environment variable is reset to a default or null value at step 85. The routine then performs a DFS system call, named dfsRemovePAG, at step 86. In the illustrative embodiment, dfsRemovePAG removes the DCE identity by stamping an invalid PAG into the Web server. At step 87, with the DCE/DFS credentials now removed from the process, the routine returns control to the server, and the routine terminates.

Thus, according to one preferred embodiment of the present invention, a certain environment variable, KRB5CCNAME in the current DCE implementations, contains the name of a file that has all the information necessary for the Web server to impersonate the user whose credentials the file contains. This file is owned by the current effective Unix user ID, and readable only by processes running as that user (or root). From the perspective of the user-space security context, it is assumed that this is proper behavior (i.e. that any process owned by the effective Unix ID can become the DCE user).

The kernel space representation of DCE security can have no such dependencies on environment variables, or pointers to data structures in user-space, but must instead rely on linkages set up in kernel data structures that cannot be compromised by user programs. DFS thus looks to the PAG in the credential and, according to the invention as noted above, the PAG is not modulated across Web transactions. This avoids the network traffic and secure remote procedure calls between DFS and the DCE Security Service (that would otherwise be required to set the security context and) that would significantly slow down the file access.

One of the preferred implementations of the plug-in and session manager of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Thus, for example, while the present invention is preferably implemented to allow off-the-shelf browsers to access Web documents stored in DFS, the principles of the invention are equally applicable with other known architectures such as AFS (from which DFS was derived), as well as the Network File System (NFS) developed by Sun Microsystems. Moreover, implementation in OSF DCE is not a requirement of the present invention either.

Further, it should be appreciated that the browser, Web server and distributed file system architecture in which the present invention is implemented can be generalized as well. In particular, the Web server may be thought of as merely a "gateway" function to provide one or more users (the Web clients in the context of the invention) access to resources in some "environment" (e.g., the distributed file system) that may or may not be on a different machine. Thus, the present invention can be seen to provide an efficient way for any gateway function to rapidly modulate between the identities that it presents to the user (from the view of the user-space) and to the environment (from the view of the environment kernel). According to the invention, it is envisioned that a user login credential be saved in the session manager for reuse across gateway transactions and that the gateway impersonate the user using this credential to obtain a service from the environment. The performance enhancements provided by the invention (through re-use of authentication information across multiple transactions) would apply as well.

Having thus described our invention, what we claim as new and desire to secure by Letters Patent is set forth in the following claims:

1. A method operative during a stateless Web transaction for enabling a Web server to impersonate a Web client to obtain access to files stored in a distributed file system of a stateful distributed computing environment, the distributed computing environment including a security service for returning a credential to a user authenticated to access the distributed file system, the method comprising the steps of:

responsive to receipt of a Web transaction request from the Web client, determining whether the transaction request has originated from a user authenticated to access the distributed file system;

if the transaction request has originated from a user authenticated to access the distributed file system, having the Web server reuse an authentication identifier of the credential of said user to retrieve a file stored in the distributed file system on behalf of the Web client; and upon logging of the Web transaction, temporarily inhibiting the Web server from using the authentication identifier until a next Web transaction by the user.

2. The method as described in claim 1 wherein if the transaction request has not originated from a user authenticated to access the distributed file system, a login sequence for the Web client is initiated to attempt to authenticate the Web client.

3. The method as described in claim 1 wherein authentication identifier is used across multiple file accesses in the distributed file system.

4. The method as described in claim 3 wherein the authentication identifier is a Process Authentication Group (PAG) that is stamped by the distributed file system into a control block of the Web server.

5. The method as described in claim 1 further including the step of maintaining a store of the credentials of users authenticated to access the distributed file system.

6. The method as described in claim 1 wherein the Web client includes a browser and is connected to the Web server via the World Wide Web of the Internet.

7. A method operative during a stateless Web transaction for enabling a Web server to impersonate a Web client to obtain access to Web documents stored in a distributed file system of a stateful distributed computing environment, the distributed computing environment including a security service for returning a credential to a user authenticated to access the distributed file system, comprising the steps of:

maintaining a storage of the credentials of the users authenticated to access the distributed file system;

responsive to receipt of a user id and password from the Web client during a Web transaction, determining whether the user id and password map into one of the credentials maintained in the storage;

if the user id and password map into one of the credentials maintained in the storage, having the Web server reuse authentication information in the credential associated with the user id and password to retrieve a file in the distributed file system on behalf of the Web client; and upon logging of the Web transaction, temporarily inhibiting the Web server from using the authentication information until a next Web transaction by the user.

8. The method as described in claim 7 wherein if the userid and password do not map into a credential maintained in the storage, a login sequence for the Web client is initiated to attempt to authenticate the Web client.

9. The method as described in claim 7 wherein the storage of credentials is maintained by a session manager process.

10. A computer program product in a computer readable medium for use in a computer during a stateless Web transaction to enable a Web server to impersonate a Web client and obtain access to Web documents stored in a distributed file system of a stateful distributed computing environment, the distributed computing environment including a security service for returning a credential to a user authenticated to access the distributed file system, the computer program product comprising:

means for maintaining a storage of the credentials of the users authenticated to access the distributed file system;

means responsive to receipt of a user id and password from the Web client during a Web transaction, for determining whether the user id and password map into one of the credentials maintained in the storage;

means responsive to the determining means for controlling the Web server to reuse authentication information in the credential associated with the user id and password to retrieve a file in the distributed file system on behalf of the Web client; and means responsive to logging of the Web transaction for temporarily inhibiting the Web server from using the authentication information until a next Web transaction by the user.

11. The computer program product as described in claim 10 further including means responsive to the determining means for initiating a login sequence if the user id and password do not map to a credential maintained in the storage.

12. The computer program product as described in claim 10 wherein the determining means and the controlling means are supported as a Server Application Function (SAF) plug-in to an Application Programming Interface of the Web Server.

13. A computer connectable to a stateful distributed computing environment having a distributed file system service and a security service for returning a credential to a user authenticated to access the distributed file system, the computer comprising:

a processor;

an operating system;

a Web server program for providing Web information retrieval to Web clients connectable to the Web server program via a stateless computer network;

a session manager program for maintaining a storage of the credentials of the users previously authenticated to access the distributed file system; and a server plug-in program responsive to receipt of a user id and password from the Web client during a Web transaction (a) for determining whether the user id and password map into one of the credentials maintained in the storage, (b) for controlling the Web server to reuse authentication information in the credential associated with the user id and password to retrieve a file in the distributed file system on behalf of the Web client; and (c) for inhibiting the Web server from using the authentication information after the Web transaction is complete and until a next Web transaction is initiated to the distributed file system from a user having the user id and password.

14. A method operative during a stateless transaction for enabling a process to impersonate a user, the process connectable to a stateful environment having a security service for returning a credential to a user authenticated to access a service in the environment, comprising the steps of:

responsive to receipt of an account name, logging in the account name to the security service to produce a user id, password, ticket and ticket expiration;

storing the user id, password, ticket and ticket expiration for reuse;

during a stateless transaction and responsive to receipt of a user id and password, checking to determine if the ticket has expired;

if the ticket has not expired, installing an authorization into the process to enable the process to obtain the service from the environment on behalf of the user; and removing the authorization upon completion of the stateless transaction.

15. The method as described in claim 14 wherein the process is a gateway function that provides the user access to the stateful environment.

16. The method as described in claim 15 wherein the gateway function is a Web server, the user is a client browser, and the stateful environment is a distributed file system service.

17. The method as described in claim 16 wherein the distributed file system service is DFS.

18. A method operative during a stateless Web transaction for enabling a Web server process to impersonate a Web client without change to the browser code used by the Web client, the Web server connectable to a stateful distributed computing environment having a distributed file system service and a security service for returning a credential to a user authenticated to access the distributed file system service, comprising the steps of:

responsive to receipt of an account name, logging in the account name to the security service to produce a user id, password, ticket and ticket expiration;

storing the user id, password, ticket and ticket expiration for reuse;

responsive to receipt of a user id and password during a Web transaction, checking to determine if the ticket has expired;

if the ticket has not expired, installing an authorization into the Web server to enable the process to retrieve a file from the distributed file system on behalf of the Web client; and upon logging of the Web transaction, removing the authorization from the Web server.

\* \* \* \* \*